United States Patent
Christen et al.

(10) Patent No.: US 10,638,773 B2
(45) Date of Patent: May 5, 2020

(54) DEVICE FOR PASTEURIZATION OF HUMAN MILK

(71) Applicant: CARAG AG, Baar (CH)

(72) Inventors: Lukas Christen, Lucerne (CH); Jérôme Bernhard, Zürich (CH); Cyrill Röthlin, Hünenberg (CH); Kuno Limacher, Steinhausen (CH); Albora De Pablo Peña, Zürich (CH)

(73) Assignee: Carag AG, Baar (CH)

( * ) Notice: Subject to any disclaimer, the term of this patent is extended or adjusted under 35 U.S.C. 154(b) by 435 days.

(21) Appl. No.: 15/319,324

(22) PCT Filed: Jun. 15, 2015

(86) PCT No.: PCT/EP2015/063312
§ 371 (c)(1),
(2) Date: Dec. 15, 2016

(87) PCT Pub. No.: WO2015/193231
PCT Pub. Date: Dec. 23, 2015

(65) Prior Publication Data
US 2017/0142992 A1    May 25, 2017

(30) Foreign Application Priority Data

Jun. 16, 2014   (EP) .................................... 14172552

(51) Int. Cl.
*A23C 9/20* (2006.01)
*A23C 3/07* (2006.01)
*A23C 3/03* (2006.01)

(52) U.S. Cl.
CPC .............. *A23C 9/206* (2013.01); *A23C 3/031* (2013.01); *A23C 3/073* (2013.01); *A23C 3/076* (2013.01)

(58) Field of Classification Search
CPC ................................ A23C 3/076; A23C 9/206
USPC ............................................ 99/451, 452, 453
See application file for complete search history.

(56) References Cited

U.S. PATENT DOCUMENTS 3,926,556 A * 12/1975 Boucher .................. A23C 3/07
250/435
5,567,616 A    10/1996 Dill, II
(Continued)

FOREIGN PATENT DOCUMENTS

| CN | 1593167 A | 3/2005 |
|---|---|---|
| CN | 1655828 A | 8/2005 |

(Continued)

OTHER PUBLICATIONS

Czank, C., et al., "Retention of the Immunological Proteins of Pasteurized Human Milk in Relation to Pasteurizer Design and Practice," Pediatric Research, vol. 66, No. 4, pp. 1-6, 2009.
(Continued)

*Primary Examiner* — Reginald Alexander
(74) *Attorney, Agent, or Firm* — McDonnell Boehnen Hulbert & Berghoff LLP

(57) ABSTRACT

A device for inactivating or reducing an amount of biological contaminants in human milk comprises an interior for taking in human milk to be treated in order to inactivate or reduce the amount of biological contaminants, and at least one UV lamp for irradiating the milk being in the interior in order to subject it to the treatment. The treatment is a first function of the device, wherein the device has a second function, the device being capable of fulfilling the first function at the same time as the second function, wherein the second function is one or more of milk expressing, milk collecting, milk storing, milk warming, milk feeding, milk processing and milk handling.

4 Claims, 7 Drawing Sheets

(56) References Cited

U.S. PATENT DOCUMENTS

| | | | |
|---|---|---|---|
| 5,675,153 A | 10/1997 | Snowball | |
| 6,540,967 B2 | 4/2003 | Mausbach et al. | |
| 6,576,201 B1 | 6/2003 | Woo et al. | |
| 6,916,452 B1* | 7/2005 | Rix | A61L 2/10 210/748.11 |
| 2008/0050471 A1* | 2/2008 | Omasa | A23B 7/157 426/66 |
| 2008/0139998 A1* | 6/2008 | Silver | A01N 25/34 604/74 |
| 2010/0242744 A1* | 9/2010 | Kastenschmidt | A23C 3/076 99/451 |
| 2015/0305357 A1* | 10/2015 | Christen | A23C 9/206 426/248 |

FOREIGN PATENT DOCUMENTS

| | | |
|---|---|---|
| GB | 324503 | 1/1930 |
| WO | 01/37675 | 5/2001 |
| WO | 2004041314 A1 | 5/2004 |
| WO | 2014094189 A1 | 6/2014 |

OTHER PUBLICATIONS

Hamprecht, K., et al., "Cytomegalovirus (CMV) Inactivation in Breast Milk: Reassessment of Pasteurization and Freeze-Thawing," Pediatric Research, vol. 56, No. 4, pp. 529-535, 2004.

Orloff, S.L., et al., "Inactivation of Human Immunodeficiency Virus Type I in Human Milk: Effects of Intrinsic Factors in Human Milk and Pasteurization," Journal of Human Lactation, vol. 9, No. 1, pp. 13-17, 1993.

Yamato, K., et al., "Inactivation of Lymphocyte-Transforming Activity of Human T-Cell Leukemia Virus Type I by Heat," Japanese Journal of Cancer Research, vol. 77, No. 1, pp. 13-15, 1986.

International Search Report and Written Opinion for Int. App. No. PCT/EP2015/063312, dated Dec. 23, 2015.

Search Report dated Jul. 23, 2019 for Chinese Patent Application No. 201580031950.3, pp. 1-4 (including English translation).

* cited by examiner

DEVICE FOR PASTEURIZATION OF HUMAN MILK

CROSS REFERENCE TO RELATED APPLICATIONS

The present application is a U.S. National Phase Application pursuant to 35 U.S.C. § 371 of International Application No. PCT/EP2015/063312 filed Jun. 15, 2015, which claims priority to European Patent Application No. 14172552.3 filed Jun. 16, 2014. The entire disclosure contents of these applications are herewith incorporated by reference into the present application.

TECHNICAL FIELD

The present invention relates to a device for inactivating or reducing an amount of biological contaminants in human milk. It especially refers to a device for pasteurization of human milk. The device is especially one of a breastshield for expressing human milk, a collection container for expressed human milk, a breastpump for expression of human milk, an attachment device for attachment to a breastpump for expression of human milk, a milk transporting line, an enteral feeding system, a bottle warmer, a feeding bottle or a teat unit of a feeding bottle.

BACKGROUND

Pasteurization of food, especially of bovine milk is well known. It is used for killing or inactivating microorganisms present in the food to prevent spoilage of the food, by the growth of the microorganisms in the food. Pasteurization occurs by heating the food to a specific temperature for a specific period of time so as to reduce the number of viable microorganisms in the food. This process is referred to as thermal pasteurization. Two common methods are known. They involve exposure of milk to a high temperature for a short period of time, followed by immediate cooling. The first method of thermal pasteurization is referred to as High Temperature Short Time (HTST) where milk is exposed to a temperature of approximately 72° C. for 15-20 seconds. The second thermal pasteurization method is referred to as low temperature long time (LTLT) or "Holder-" pasteurization, where milk is heated to 62.5° C. and kept for 30 minutes. These are the only universally approved techniques.

Pasteurization of human milk becomes more and more important. It is currently employed for milk banking where milk is donated, screened and supplied to an infant when milk from the infant's mother is not available.

Human milk is very seldom sterile. Presently, approximately 15% of milk collected at various milk banks has to be thrown away in some countries because it contains pathogenic bacteria such as *S. aureus, Enterobacteriacea* and *Enterococci*. Approximately 6% has to be thrown away because the total count of bacteria is over 100,000 colony forming units (CFU/ml). Furthermore, Human immunodeficiency virus (HIV), cytomegalovirus (CMV), Human T-lymphotropic virus (HTLV) and other viruses may be transmitted by human milk and cause infections and diseases. Furthermore, transmission of disease can also be mediated through heat resistant spores that survive thermal pasteurization.

Human milk can be pasteurized by HTST or LTLT methods. Holder Pasteurization is capable of causing a 5-$\log_{10}$ reduction of a variety of bacterial species including *Escherichia coli, Staphylococcus epidermidis, Enterobacter cloacae, Bacillus cereus* and *Staphylococcus aureus* in human milk (Czank C, et al, Pediatric Research 2009; 66:374-379). Furthermore, HIV, CMV and HTLV are eliminated by the Holder pasteurization (Orloff S. et al., Journal of Human Lactation 1993; 9:13-17/Hamprecht K. et al., Pediatric Research 2004, 56:529-535/Yamato K. et al, Japanese Journal of Cancer Research 1986; 77:13-15). Therefore, thermal pasteurization minimizes the risk of transmission of diseases via human milk.

However, important, heat labile bioactive components present in human milk can be altered or lost from the milk when it is subjected to thermal pasteurization. Accordingly, there exists a need to provide an improved method of pasteurization of human milk that sufficiently inactivates biological contaminants without altering or inactivating important bioactive components.

Ultraviolet (UV) light treatment has been employed for the pasteurization and decontamination of drinking water, beer, wine and fruit juices, cut and whole fruit and also for air purification and packaging of fresh food. Exposure of substances to UV, or UV treatment, is classified as a non-thermal disinfection method. This has been referred to by some in the art as "UV-" or "Cold Pasteurization".

Ultraviolet light is defined as electromagnetic radiation having wavelengths shorter than visible light but longer than X-rays. Effective UV treatment of a liquid to be pasteurized requires a sufficient dosage, i.e. sufficient exposure of the biological contaminants to the UV. The degree to which UV penetrates the liquid depends on the solubility, density and turbidity of the liquid.

Previous studies have demonstrated that UV treatment could be used to reduce the microbial load of opaque liquids. However, milk is difficult to treat with UV due to its high absorption coefficient of 300 $cm^{-1}$ at a wavelength of 254 nm compared to the absorption coefficient of drinking water and beer with 0.1 and 20 $cm^{-1}$, respectively.

Indeed, various flow-through reactors have been developed to ensure sufficient UV exposure is achieved where large volumes of liquid are to be treated and where the liquids to be treated are turbid and light penetration is limited. Such flow-through reactors are designed to spread the liquid into a thin layer or film, or alternatively, a turbulent flow is imparted to the liquid which is caused to flow around the UV source thereby exposing the biological contaminants to photons at the interface between the opaque liquid and the photon source. Such apparatuses are described in U.S. Pat. Nos. 5,675,153, 5,567,616, 6,540,967, 6,576,201 and WO 01/37675.

However, there exist a number of disadvantages associated with current methods and devices for pasteurization of bovine milk or fruit juice that make their application to pasteurization of human milk unworkable.

Firstly, present methods are directed towards the treatment of large volumes of milk which are required to be pumped from a source to a UV reactor and subsequently recirculated or passed through a plurality of reactors. Human milk can only be collected in small volumes and such small volumes would be lost in those large reactors.

Secondly, other problems associated with the requirement to pump milk through a reactor include: stasis of the milk within certain sections of the apparatus which permits collection and growth of biological contaminants; deposition of milk solids upon the surfaces of the reactor which can lead to impedance of UV penetration and difficulty in cleaning the apparatus; and undesirable properties being imparted to the milk such as the formation of butter from coalescence of milk fat globules resulting from turbulent flow applied to the milk. These devices can be difficult to maintain.

Another problem faced by present methods of pasteurizing human milk is a reduction and/or loss of activity of various important bioactive components present in human milk. Current methods for pasteurization of human milk, such as Holder pasteurization, are aimed at reducing the bacterial load of human milk without consideration of maintaining an effective level of important bioactive components in the milk. Pasteurization of human milk is based on the technology developed by the dairy industry. The aim of the dairy industry is to reduce the enzymatic activity in bovine milk to increase shelf-life. In human milk the enzymatic activity is needed to transfer the whole benefit of human milk to the infant.

Human milk has been shown to inhibit the growth of *Escherichia coli, Staphylococcus aureus* and *Candida* spp. This bacteriostatic property of human milk is thought to be predominantly due to immunological proteins including lactoferrin, lysozyme and sIgA. Lactoferrin is an iron-binding protein that reduces the availability of free iron required by iron-dependent pathogens such as *E. coli* and therefore inhibits their growth, as well as disrupting the bacterial cell membrane by binding to the lipid-A portion of lipopolysaccharides on the bacterial cell surface. Lysozyme lyses the cell walls of most gram-positive bacteria such as *S. aureus* by catalyzing the hydrolysis of specific bonds between N-acetylglucosamine and N-acetylmuramic acid. While lysozyme alone is bacteriostatic, an in vitro study showed that in presence of lactoferrin it is also bactericidal and can kill some gram-negative bacteria. Secretory IgA (sIgA) is an antibody, which is secreted specifically in response to the pathogens the mother and infant are exposed to and therefore, is boosting the infant's immune defence system. sIgA is more able to persist in the intestinal tract than other immunoglobulins due to its resistance to proteolytic enzymes. Although sIgA has no known antimicrobial activity in human milk it enhances the antimicrobial activity of lactoferrin and lysozyme and it plays a major role in the infant's immune defence when digested. The activity and retention of such bioactive components can be adversely impacted using thermal pasteurization.

The PCT application WO 2014/094189, filed Dec. 13, 2013 and claiming two Australian priority dates, refers to a method of pasteurizing small volumes of a human milk product and an apparatus for the same that can be conveniently used by breast feeding mothers, in milk banks, in hospitals and in other clinical settings and that overcomes the above mentioned problems. The method described in this unpublished application especially preserves or retains important bioactive components while sufficiently inactivates biological contaminants in human milk. This is achieved by exposing a milk product to ultraviolet light (UV) and imparting a vortical flow to the milk product to facilitate exposure of the contaminant in the milk product to the UV light. The apparatus for inactivating or reducing an amount of a biological contaminant in a human milk product comprises a container for containing a volume of a human milk product, a UV light source arranged outside of or inside the container such that the human milk product is exposed to UV light; and a means to apply a vortical flow to said milk product retained inside said container so as to facilitate exposure of the contaminant to the UV light source.

As used herein "vortical flow" refers to a flow of liquid wherein the liquid flows in layers in a rotary or spinning motion about an imaginary axis. The axis may be straight or curved. There may be some disruption or mixing in the flow between layers and some turbulence which may occur at various points in the flow of a liquid within a container but the majority of the liquid flows in a vortical fashion.

The vortical flow may be imparted by placing a magnetic bar into the milk container and by rotating the magnetic bar with an appropriate device. It is suggested to use a magnetic stirrer. A balance is applied in creating a fast enough flow for optimal microorganism exposure to the UV-C photons and minimizing the risk of damaging the human milk. This can be achieved by adjusting the revolution speed and/or the method of stirring. Furthermore the size and shape of the stirring means may be adjusted to reduce shear forces. It is also suggested to use a rotating container.

The method and apparatus preferably inactivate or reduce the amount of a biological contaminant present in human milk, wherein the contaminant is selected from *E. coli, Staphylococcus* spp., *Streptococcus* spp., *Bacillus* spp., *Enterococcus* spp. and *Enterobacter* spp. Preferably, they additionally or alternatively inactivate or reduce the amount of a biological contaminant present in human milk, wherein the contaminant is selected from CMV, HIV and HTLV.

As used herein, the term "biological contaminant" refers to but is not limited to micro-organisms such as viruses, bacteria, protozoa, yeasts, spores, moulds and algae. Such biological contaminants can include viruses (including viral nucleic acids) selected from but not limited to B-type (retrovirus-like particles), Coxsackievirus B3, Cytomegalovirus (CMV), Ebola virus, Echovirus 18, Epstein-Barr virus (EBV), Hepatitis B virus, Hepatitis C virus, Hepatitis E virus, Herpes simplex virus type 1, Human herpesvirus 6, Human herpesvirus 7, Human immunodeficiency virus (HIV) type 1 (and 2), Human T-lymphotropic virus (HTLV), Human papillomavirus 16, Rotavirus, Rubella virus, Sin nombre (no name) hantavirus RNA, Transfusion-transmission virus (TTV), Varicella-zoster virus, West Nile virus; Bacteria and fungi including but not limited to *Staphylococcus* spp., *Streptoccoccus* spp., *Bascillus* spp., *Campylobacter* spp., *Enterococcus* spp. and *Enterobacter* spp., *E. coli, Bacillus cereus, Borrelia burgdorferi, Brucella melitensis, Burkholderia pseudomallei, Candida albicans, Citrobacter freundii, Coxiella burnetti, Enterbacter aerogenes, E. cloaca, Klebsiella pneumonia, Lactobacillus gasseri, Enterococcus faecium, Leptospira australis, Listeria monocytogenes, Mycobacterium paratuberculosis, Mycobacterium tuberculosis, Pseudomonas Aeruginosa, Salmonella Kottbus, Salmonella panama, Salmonella senfrenberg, Salmonella typhimurium, Serratia marcescens, Staphylococcus aureus, Staphylococcus epidermis* and *Streptococcus agalactiae*; Parasites including but not limited to *Necator americanus, Onchocerca volvulus, Schistosoma mansoni, Strongyloides fulleborni, Toxoplasma gondii, Trichinella spiralis,* and *Trypanosoma cruzi*.

As used herein, the term "inactivate" (and forms thereof) means the actual destruction, eradication of a contaminant, or a direct or indirect effect on the contaminant that substantially inhibits its ability to replicate or otherwise to adversely affect a living recipient.

As used herein the term "reduce" (and variants thereof) when applied to a biological contaminant refers to a lowering in the amount of biological contaminant or a reduction in the number of contaminants that are active and/or capable of replicating and/or infecting an individual.

SUMMARY

It is therefore an object of the invention to provide a device for inactivating or reducing an amount of biological contaminants in human milk which can be easily used by a breast feeding mother, in milk banks, in hospitals and in other clinical settings.

The inventive device for inactivating or reducing an amount of biological contaminants in human milk comprises an interior for taking in human milk to be treated in order to inactivate or reduce the amount of biological contaminants, and at least one UV lamp for irradiating the milk being in the interior in order to subject it to the treatment. This treatment, in this text also called "pasteurization", is a first function of the device. The device has a second function, the device being capable of fulfilling the first function at the same time as the second function. The second function is one or more of milk expressing, milk collecting, milk storing, milk warming, milk feeding, milk processing and milk handling. Milk processing is for example homogenization and/or fortification and/or concentrating and/or enriching procedures. Milk handling is for example pooling and/or dipping, and/or filling up and/or pooling.

Therefore no special device is needed for the treatment, especially for the pasteurization of human milk. Since a device being already used in the process of obtaining, storing or feeding the human milk is additionally provided with the pasteurization function, the step of pasteurization will always be made.

Milk banking and hospital staff does not have to additionally treat the human milk. They can be sure that the expressed or stored milk is already treated, especially pasteurized. Milk given to infants by using the inventive feeding devices is automatically treated and harmful biological contaminants are automatically inactivated or reduced. A mother with an infectious disease expressing milk does also not have to remember that she has to additionally treat, especially pasteurize, the milk afterwards.

In a preferred method, the milk is treated and pasteurized only once. This can happen during expression of the milk. This can also happen shortly before or during feeding the milk. This reduces the workload of the milk bank and hospital staff. However, it is also possible to treat the milk several times between milk expression and feeding to the baby.

Even if the human milk is not fully pasteurized shortly after expression, the amount of harmful biological contaminants is reduced sufficiently until the milk can be further treated. For example, the milk expressed at home is sufficiently treated until it reaches the milk bank. Milk expressed in hospital is sufficiently treated until the staff has time to take over. Milk fed to an infant is additionally treated to reduce or inactivate biological contaminants remaining in the milk.

The device is preferably one of a breastshield for applying to a human female breast for expressing human milk, a collection container for expressed human milk, a breastpump for expression of human milk, an attachment device for attachment to a breastpump for expression of human milk, a milk transporting line for connecting a breastshield to the breastpump, a chamber for a milk transporting line, an enteral feeding system, a feeding line, a chamber for a feeding line, a bottle warmer, a feeding bottle and a teat unit of a feeding bottle.

In the majority of the devices mentioned above the human milk irradiated by the UV lamp is present in a small amount, especially as drops or a thin film. The drops can for example also be led through a thin gap creating a film which is then subjected to UV light. The amount of milk is therefore small and thin enough so that the treatment with UV lamp is sufficient and no additional means for generating a vortical flow is needed. Even in the milk collecting bottle additional means for generating a vortical flow do not have to be present, since the milk enters the bottle drop by drop. The amount of milk present in a syringe for tube feeding or enteral feeding is usually also small enough. A milk feeding bottle may be shaked by hand during irradiation with UV light, so that sufficient vortical flow is produced. Even if it is not shaked, the milkflow into the feeding teat can be made sufficiently small to enable treatment of the milk by UV light. Milk stored in a milk container which is warmed in a bottle warmer may be subjected to movement within the bottle warmer apparatus.

The interior of these devices can therefore be void and it can only contain the human milk to be treated. However in other embodiments, the interior comprises means for generating a vortical flow and/or for stirring the milk present in the interior and/or for reducing the milk flow into drops or a thin film. These means can be the at least one UV lamp itself. They can alternatively or additionally be at least one rib or at least one grid or mesh arranged in the interior.

In one embodiment of the invention, the device is a breastshield for applying to a human female breast for expressing human milk, wherein the at least one UV lamp is arranged on an outside, an inside, within a wall material or in the interior of the breastshield. The UV lamp can be the light source itself or it can be only a light distribution optical device and the light is supplied by at least one optical fibre to the breastshield. The UV light source can for example be arranged in the breastpump housing. The same applies for the other embodiments described below, especially for the container, the milk line and the syringe.

In another embodiment of the invention, the device is a milk collection or milk feeding container, wherein the at least one UV lamp is arranged on an outside, an inside, within a wall material or in the interior of the container. In a preferred embodiment, an additional ultrasonic probe or device is arranged within the container so that the milk can be homogenized at the same time or before or after the milk was pasteurized. Using the ultrasonic device during irradiation with UV light makes an additional moving device superfluous. The milk is sufficiently moved during subjection to the ultrasound so that a sufficient reduction of biological contaminants in the human milk is achieved.

In another embodiment of the invention, the device is a breastpump for applying to a human female breast for expressing human milk, wherein the at least one UV lamp is arranged on an outside, an inside, or in the interior of a housing of the breastpump or of an extension part of the housing.

In another embodiment of the invention, the device is a milk transporting line, wherein the at least one UV lamp is arranged on an outside, an inside, within a wall material or in the interior of the milk transporting line. In a preferred embodiment, the milk transporting line comprises a chamber with a first inner diameter which is preferably identical to or smaller than a diameter of the rest of the milk transporting line. The milk transporting line is for example a milk collection line transporting milk from a breastshield to a milk collection container or a feeding from a milk container to the infant. It can especially be an enteral feeding line, such as a catheter or a tube.

In another embodiment of the invention, the device is an enteral feeding system and the at least one UV lamp is arranged adjacent to a syringe or the lamp is implemented into the syringe.

In another embodiment of the invention, the device is a bottle warmer, wherein the device comprises moving means for generating a vortical flow within an interior of a bottle placed in the bottle warmer.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same, in the drawings.

DETAILED DESCRIPTION

Figure 1:
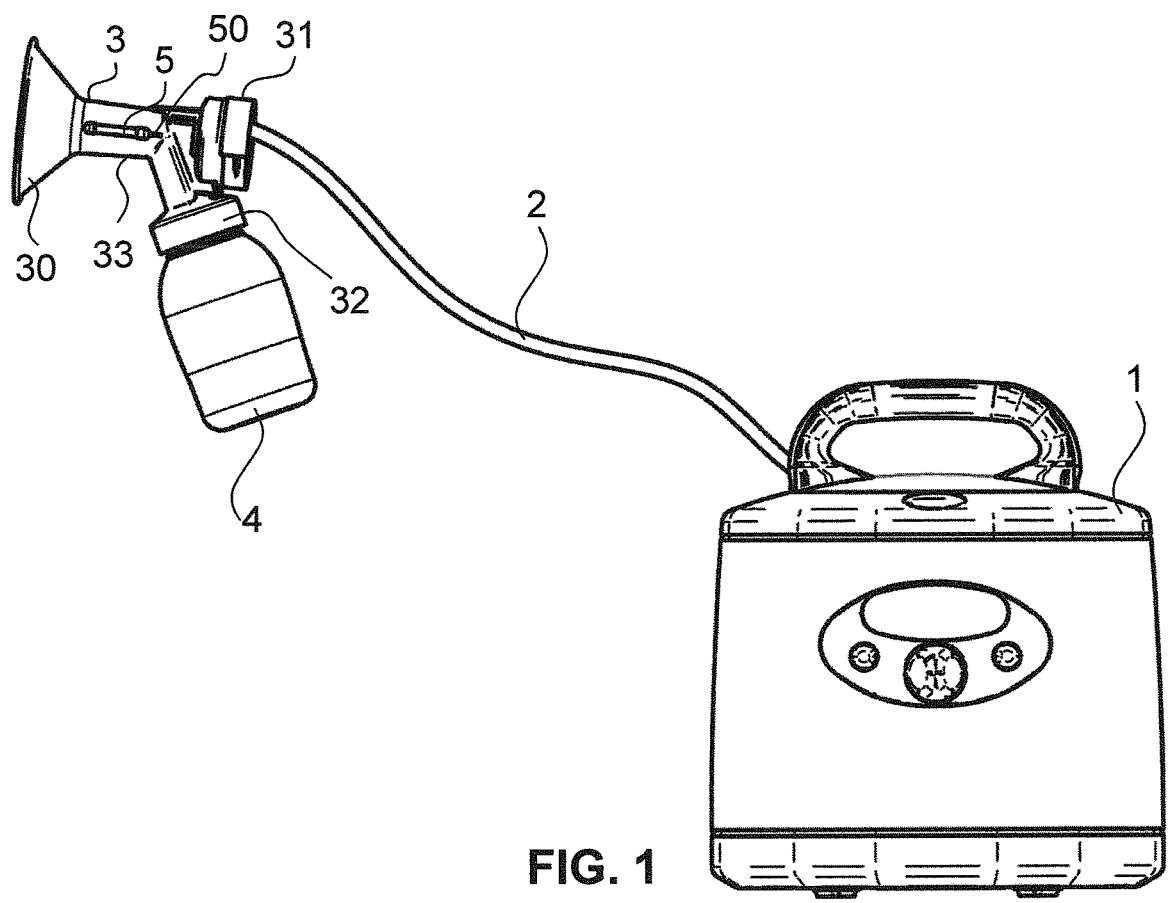
FIG. 1 shows a breastpump assembly for expressing human milk with a breastshield according to a first embodiment of the invention.

FIG. 1 shows an inventive breastpump assembly according to a first embodiment of the invention. The assembly comprises a breastpump 1 for expressing human mother's milk, one or two breastshields 3 connected via a vacuum line 2 to the breastpump and one or two milk collection containers 4, each connected to one of the breastshields 3.

The breastpump 1 is well known in the art. It can be a hand-driven pump or a motorized pump. Preferably, it is an electrically driven membrane vacuum pump, such as the one known under the trade name of "Symphony" from Medela.

The breastshield 3 can be directly connected to the breastpump or there can be a vacuum tube or vacuum line 2 in between, supplying an underpressure generated in the vacuum pump of breastpump to the interior of the breastshield 3. The breastshield can have any convenient shape or size. Usually it has a funnel 30 for applying to a mother's breast, the funnel usually ending in a tubular part 33, which divides in a first connection portion 31 for connection to the breastpump or the vacuum line and a second connection portion 32 for connection to a milk collection container 4. The milk collection container 4 can directly be connected to the breastshield 3 as shown in FIG. 1 or it can be connected by a milk line, normally a tube. The milk line and the vacuum line can also be the same line. The milk collection container 4 can for example be a flexible bag or a bottle. The bottle can be made of glass or plastic and it may be used only as milk storing bottle or as feeding bottle as well.

The inventive assembly also comprises at least one UV light source, also called herein UV lamp 5. The UV light source preferably emits UV-C light, preferably in the range of 250 nm to 280 nm, and most preferably at 207 nm or 254 nm.

In the embodiment according to FIG. 1, the UV lamp 5 is arranged at the breastshield 3, preferably at the tubular part 33. The UV lamp 5 can be attached to the outside of the breastshield 3. It can also be arranged within the wall material of the breastshield 3 or it can be arranged on the inside of the breastshield 3, therefore directly contacting the milk flowing through the breastshield 3. There can be more than one UV lamp arranged at the breastshield 3. For example there can be two, three, four or more UV lamps 5 arranged around the circumference of the tubular part 33.

Each UV lamp 5 comprises a power supply line 50 connected to a power source. The power source can be an integral part of the lamp 5 itself. Preferably the lamp 5 is connected via the power supply line 50 to an external power source. This power source is preferably located within the breastpump 1 or the power supply line 50 is connected to the breastpump 1 which itself can be connected to a power supply source. The connections mentioned above are not shown in the drawings.

The breastshield 3 is preferably made of a glass or plastic, especially of polypropylene. In the case where UV lamp 5 is arranged within the wall material of the breastshield 3 or on the outer surface of the breastshield 3, care has to be taken that the wall thickness and the material of the breastshield 3 are chosen such that sufficient transmission of UV light through the wall, preferably with minimal absorbance of the UV light by the wall material, is achieved. The material should be transparent to UV light. Quartz glass and a plastic like fluorinated ethylene propylene comprise this feature.

Milk expressed from the mother's breast into the breast shield passes the region irradiated by the at least one UV lamp 5. Since the milk flow from the mother's breast is quite small, the thin film or the size of drops of milk enable pasteurization of the milk passing the lamp. The tubular part can therefore comprise a cylindrical flow through opening without any chicanes. In a variant however, chicanes, such as ribs, spirals or narrowing are arranged within the region irradiated by the UV lamp 5, i.e. here within the tubular part to create a turbulent flow or a thin film.

The lamp preferably emits light in the wavelength of 207 nm and/or 254 nm.

Figure 2:
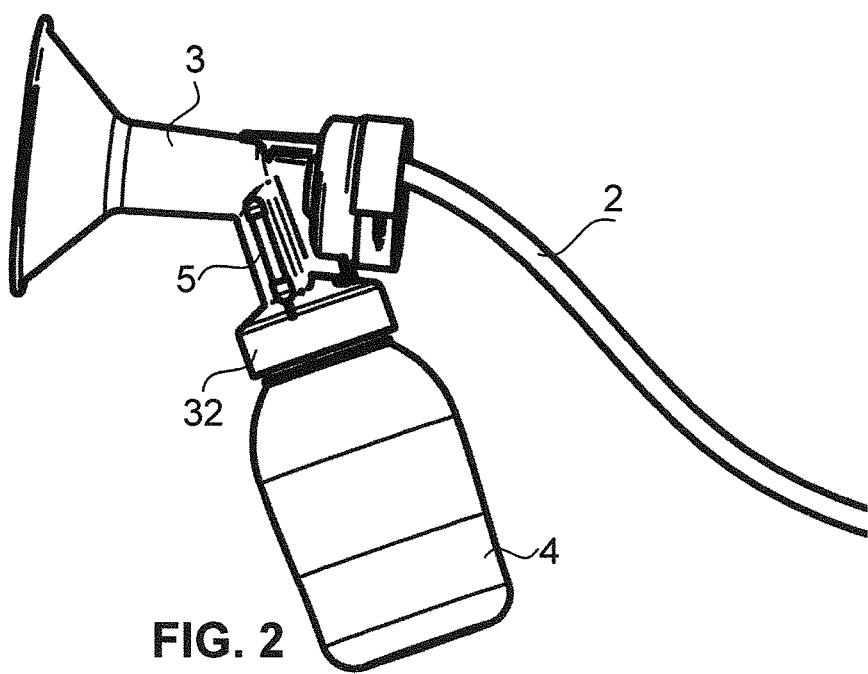
FIG. 2 shows a breastshield with a milk collection bottle according to a second embodiment of the invention.
Figure 3:
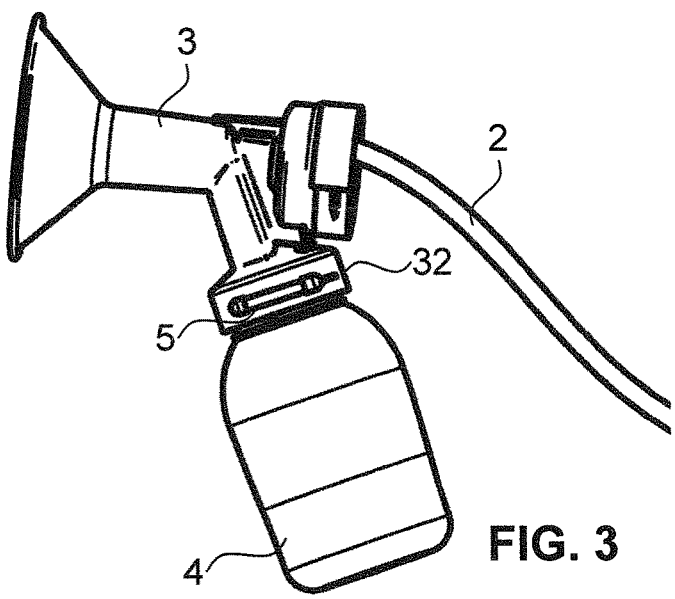
FIG. 3 shows a breastshield with a milk collection bottle in a third embodiment of the invention.

In the embodiments according to FIGS. 2 and 3, the UV lamp 5 is arranged on the outer surface, within the wall material or in the inside of the second connection part 32, i.e. the part connecting the breastshield 3 to a milk line or to a milk collection container 4. Everything else mentioned above for the first embodiment applies for these two embodiments as well. In the embodiment according to FIG. 2, the lamp 5 is arranged on the upper part of the connection part 32, i.e. on the cylindrical part. In the embodiment according to FIG. 3, the UV lamp 5 is arranged on the lower part of the connection part 32, i.e. on the part comprising an internal connection thread. There may also be a valve present within the breastshield, especially in the region of the internal connection thread. In one embodiment, the UV lamp 5 is arranged on the part of the valve, especially when seen in direction of the milk flow on the downstream side of the valve.

Figure 4:
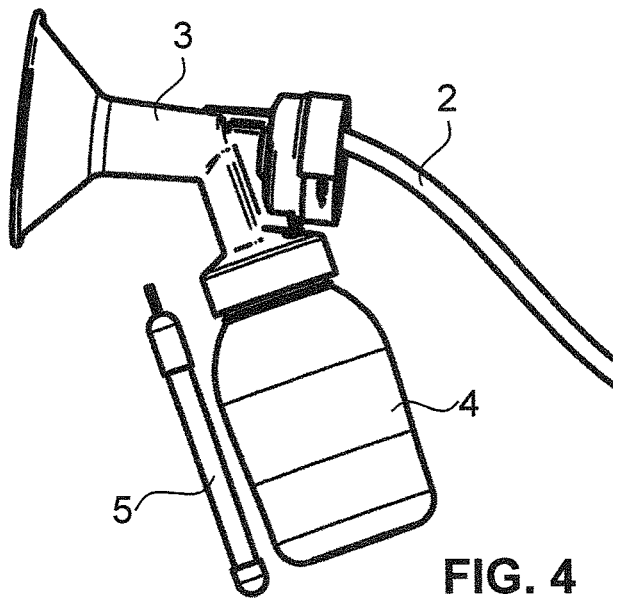
FIG. 4 shows a breastshield with a milk collection bottle in a fourth embodiment of the invention.
Figure 5:
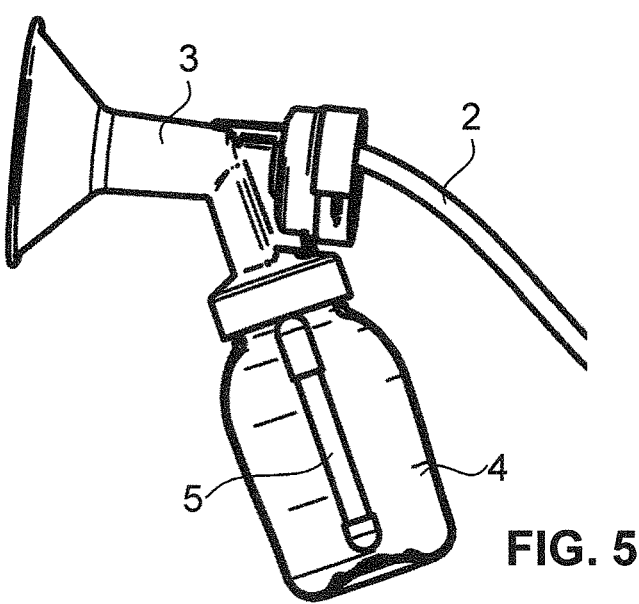
FIG. 5 shows a breastshield with a milk collection bottle in a fifth embodiment of the invention.

In the embodiments according to FIGS. 4 and 5, the at least one UV lamp 5 is arranged at the container 4. The container 4 is preferably a bottle, preferably made of plastic and more preferably made of a plastic as mentioned for the above breastshield 3. However, the container 4 can also be a flexible bag or another convenient container. In FIG. 4, the UV lamp is arranged at the outside of the container 4. In one embodiment according to FIG. 4, a holder is arranged at or fixed to the outside of the container 4. For example, a holder can be glued to the container or formed in one single piece with the container by injection moulding or blow forming.

In the embodiment according to FIG. 5, the UV lamp 5 is arranged within the container 4. It can be loose or it can be fixed to an interior side or bottom wall of the container.

Figure 6:
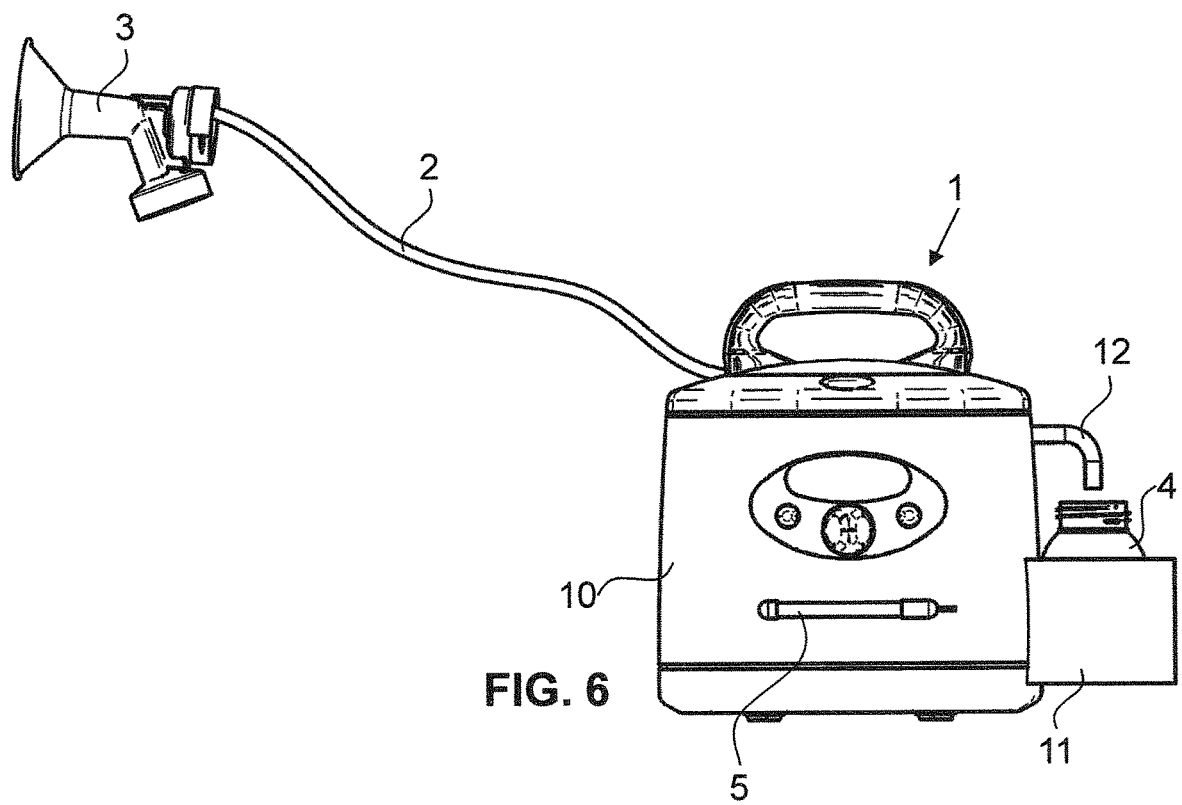
FIG. 6 shows a breastpump with a breastshield according to a sixth embodiment of the invention.
Figure 7:
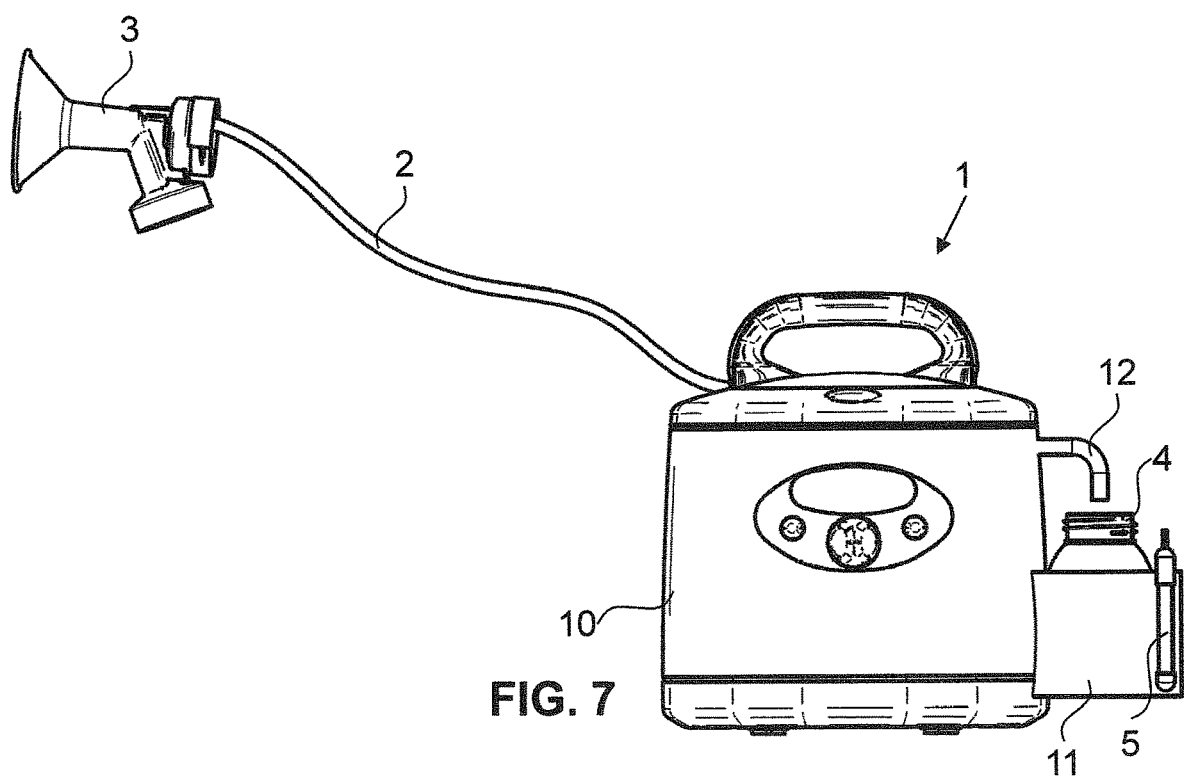
FIG. 7 shows a breastpump with a breastshield according to a seventh embodiment of the invention.

FIGS. 6 and 7 show further embodiments of the inventive systems. The breastpump 1 comprises a housing 10 within which a pump aggregate for generating a vacuum is arranged. The breastshield 3 is preferably connectable to the housing 10 by use of the vacuum line 2. The vacuum line 2 or a separate milk line extends starting from the breastshield 3 and ending at the breastpump 1. An extension of the separate milk line or the milk forwarding vacuum line 2, the extension being in this embodiment an outlet conduit 12, leads to the outside of the housing 10. The housing 10 comprises an extension part 11 for holding the milk collection containter 14. The extension of the milk forwarding line, for example the outlet conduit 12, ends at the opening of the milk collection container 4, so that expressed milk can be forwarded from the breastshield 3 to the container 4. In the embodiment according to FIG. 6, the UV lamp is arranged at or more preferably in the housing 10 of the breastpump and it irradiates the milk while the milk flows through the milk transporting line. In the embodiment according to FIG. 7, the UV lamp is arranged at the extension part 11 near the container 4. The UV lamp irradiates the milk already collected in the container 4. In a preferred embodiment, a vortical flow is produced within the container by appropriate means mentioned in this text. The extension part 11 can be arranged at the outside of the container, protruding the housing 10. It can be fixedly connected or removably fixed. However, in other embodiments, the housing 10 comprises a recess for the container 4, wherein the UV lamp is for example arranged at the housing 10 itself. In other embodiment the housing 10 comprises a closable compartment for the container 4. In these embodiments as well, more than one UV lamp 5 can be present.

Figure 8:
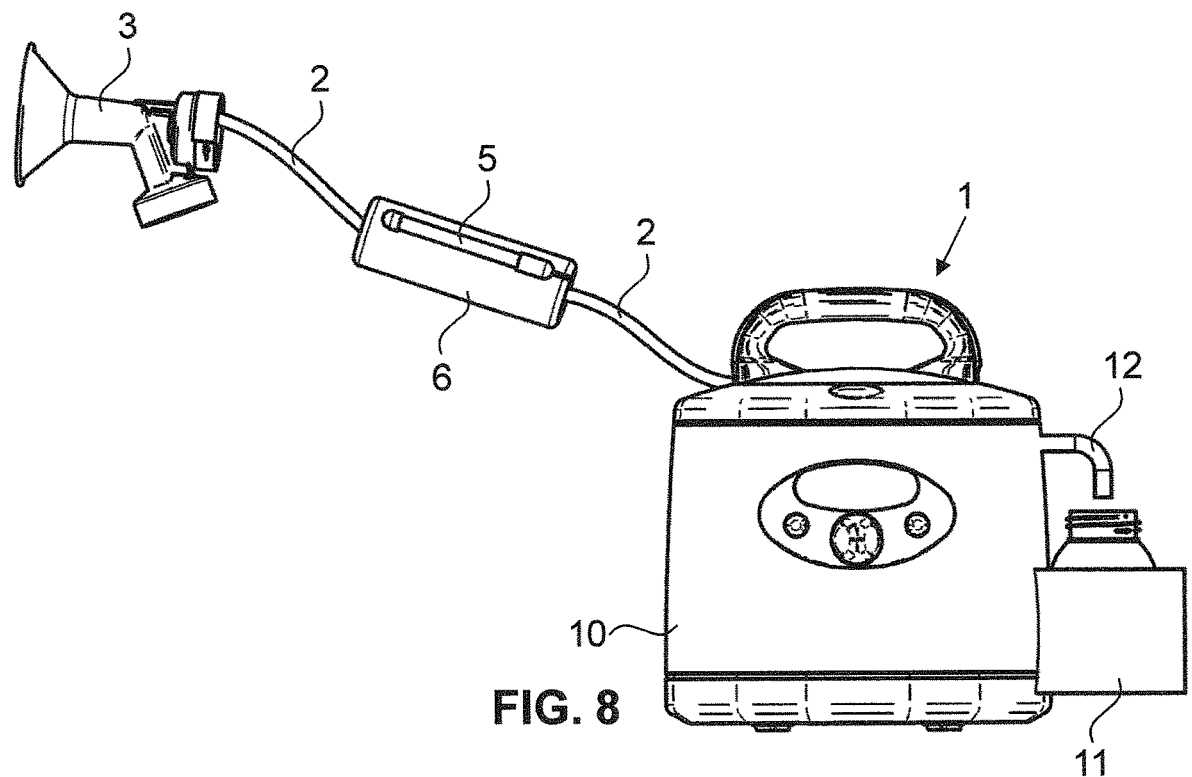
FIG. 8 shows a breastpump with a breastshield according to an eighth embodiment of the invention.

In the embodiment according to FIG. 8, the suction line 2 is used as a milk transporting line as well. The line 2 comprises a chamber 6. The chamber 6 has a length and a diameter, the diameter being preferably greater than the diameter of the other parts of the suction line 2. The chamber 6 can also be a separate item having a first and a second port arranged at opposite ends of the chamber 6 and the item having an internal channel fluidly connecting the first with the second port. A first part of a vacuum and milk line 2 is entered into the first port connecting the breastpump 1 with the chamber 6 and a second part of a vacuum and milk line 2 is entered into the second port connecting the chamber 6 with the breastshield 3. In case a milk line being separate from the vacuum line is used, the chamber 6 is arranged in the milk line. The chamber comprises at least one UV lamp arranged on the outside or within the wall material or in the interior or at the inner surface of the chamber. The chamber is preferably made of a material as described above for the UV lamp bearing breastshield 3. As also already described above, the interior can be void or it can comprise means for generating a vortical flow. The means are for example ribs, spirals or at least one narrowing arranged in the interior.

The examples mentioned above all relate to time when the milk is expressed from a mother's breast and the milk is pasteurized during breast pumping.

Figure 9:
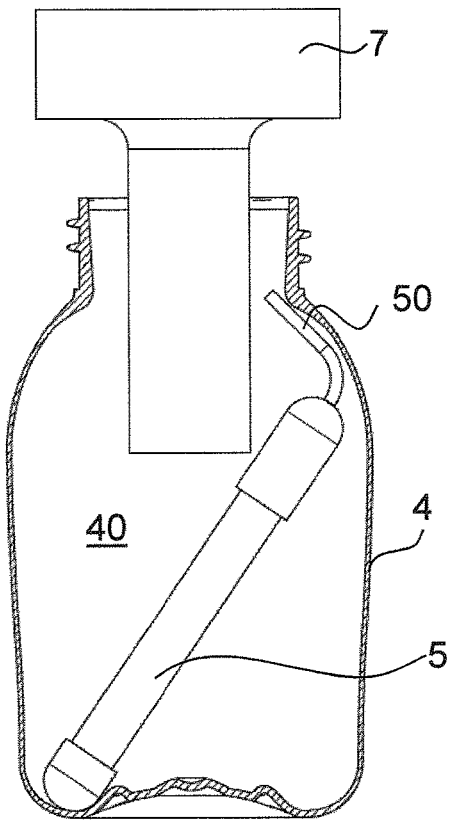
FIG. 9 shows a milk bottle according to a ninth embodiment of the invention.

In the example of FIG. 9, the milk is already collected and it is stored in a milk collection or milk storing container 4. The container can be for example a flexible bag or a bottle. The UV lamp 5 is placed within the interior 40 of the milk collection container 4. An ultrasonic device 7 is additionally entered through the access opening of the bottle or container 4 into the interior 40 and the milk is homogenized by this ultrasonic device. Milk fat globule are therefore reduced to smaller pieces. Pasteurization and homogenisation can be made at the same time or one after the other. When both treatments are applied at the same time, no additional stirring or mixing is necessary. The movement of the milk when applied to ultrasonic sound is sufficient to achieve an optimum result during irradiation with the UV light. This double treated milk is especially suitable for use in a line or tube feeding system, such as in an enteral feeding system.

By using homogenized milk in the enteral feeding system, the risk of loosing fat globule in the feeding line is reduced. The homogenization prevents the fat globule to stick to the inner wall of the feeding tube, the line and the syringe. Homogenization can be performed before, during or after pasteurization.

Figure 10:
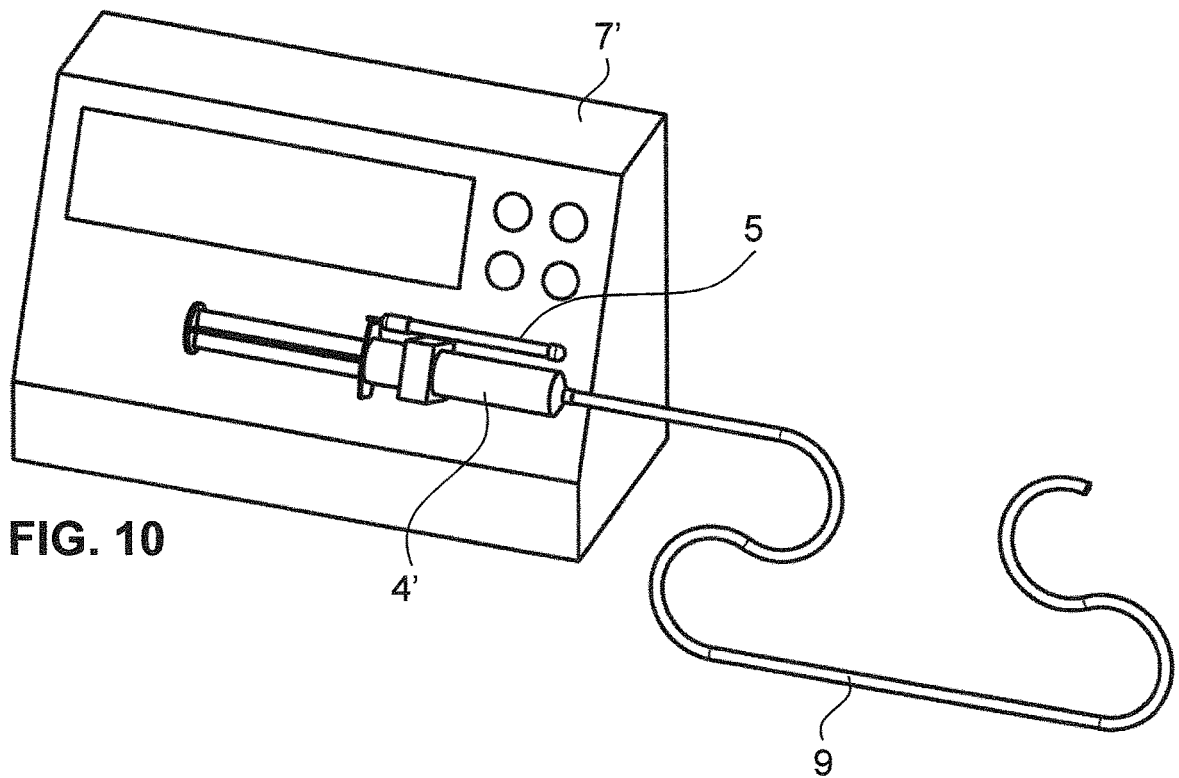
FIGS. 10 and 11 show enteral feeding systems according to further embodiments of the invention.
Figure 11:
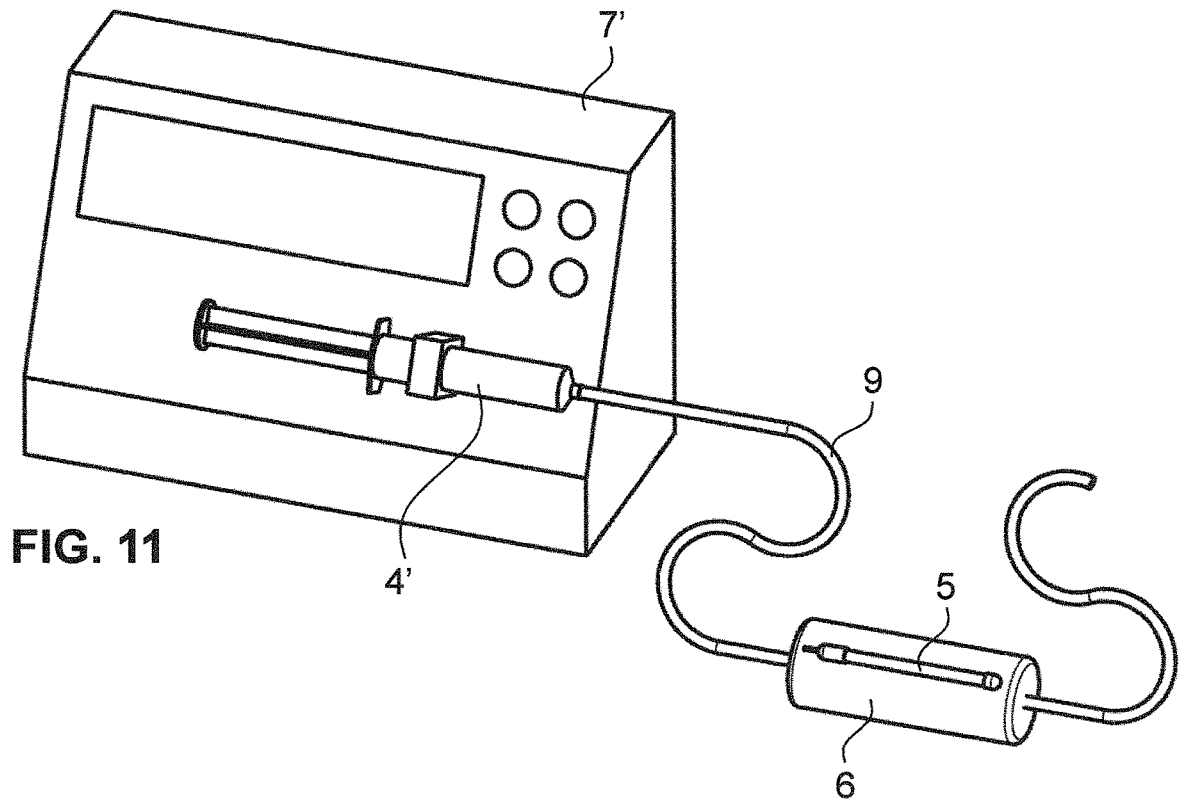

The embodiments according to FIGS. 10 and 11 refer to an enteral feeding system. Reference number 7' refers to a syringe pump. In FIG. 10, the content of the syringe 4' comprising in its interior the human milk is irradiated by the at least one UV lamp 5. The syringe 4' is hold at the outside of the housing of the syringe pump 7', so is the UV lamp 5, wherein the at least one UV lamp 5 is arranged at the vicinity of the syringe's 4' holder. In the embodiment according to FIG. 11, a feeding line 9, starting at the syringe 4' and ending at the infant to be fed, comprises the chamber 6 with the at least one UV lamp. This chamber 6 was already described above. It is also possible to homogenize the milk in these embodiments. For example an ultrasonic device can be arranged in the syringe pump 7' and apply ultrasound to the syringe. It can also be arranged near the chamber 6.

Figure 12:
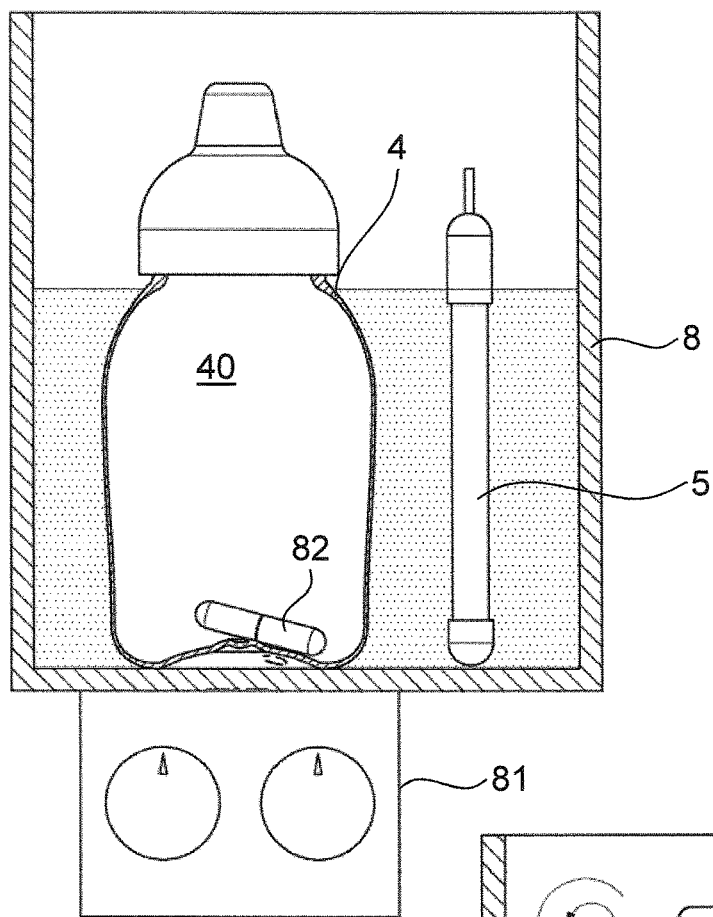
FIGS. 12 and 13 show bottle warmers according to further embodiments of the invention and FIGS. 14 to 16 show feeding bottles according to further embodiments of the invention.
Figure 13:
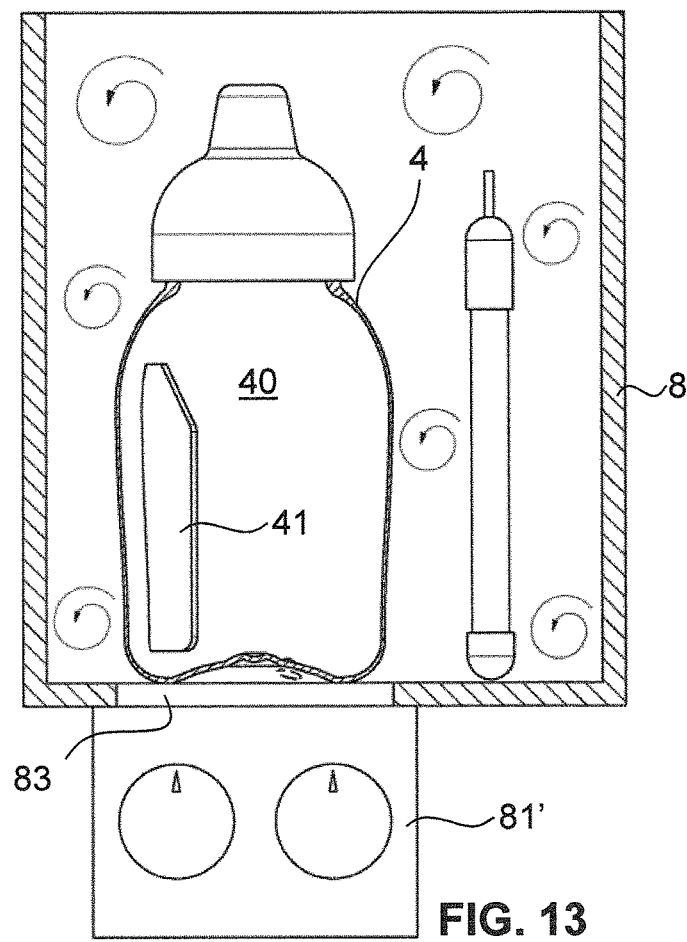

The embodiments according to FIGS. 12 and 13 shows containers or bottle warmers 8. The bottle warmer 8 is preferably an electrical heating device. In one example the bottle warmer 8 uses a liquid which will be warmed or is already warmed. This is shown in FIG. 12. In the embodiment according to FIG. 13, air or gas is used as heating element. The air or gas is symbolised in FIG. 13 by the spiral like arrows.

A bag, a bottle or another kind of container 4 is arranged within an interior of the bottle warmer 8 and is subjected to the temperature of the heating liquid, air or gas. In the embodiment according to FIG. 12, a magnetic bar 82 is placed within the interior of the milk container 4 and the bottle warmer 8 comprises a moving device 81 for moving the magnetic bar 82, such as an electrical coil. In the embodiment according to FIG. 13 the milk container 4 is placed on a shaking plate 83 arranged within the bottle warmer 8. The bottle warmer 8 comprises a moving device 81' for moving this shaking or turning table 83. Preferably, the milk container 4 comprises at least one inner rib 41 or other means for generating a vortical flow. This inner rib 41 or other means for generating a vortical flow can also be used with the other milk containers 4 and the chambers 6 described in this text. Alternatively or in addition, the bottle warmer 8 can also comprise an ultrasonic device, such as horn, for homogenization of the milk.

Figure 14:
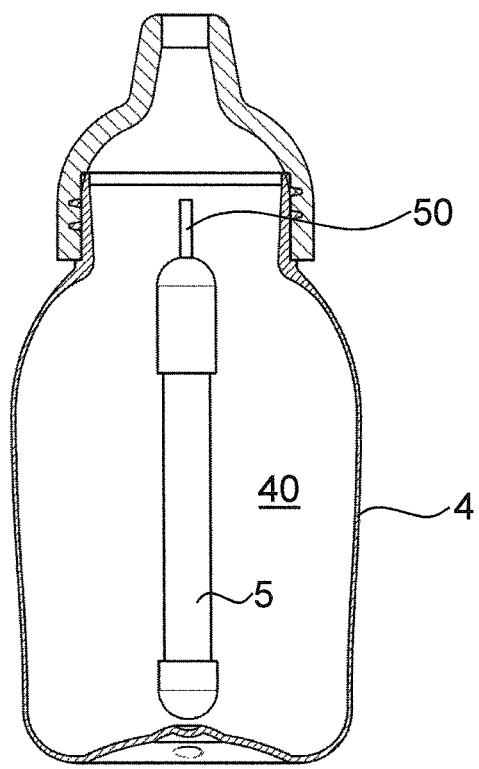
Figure 15:
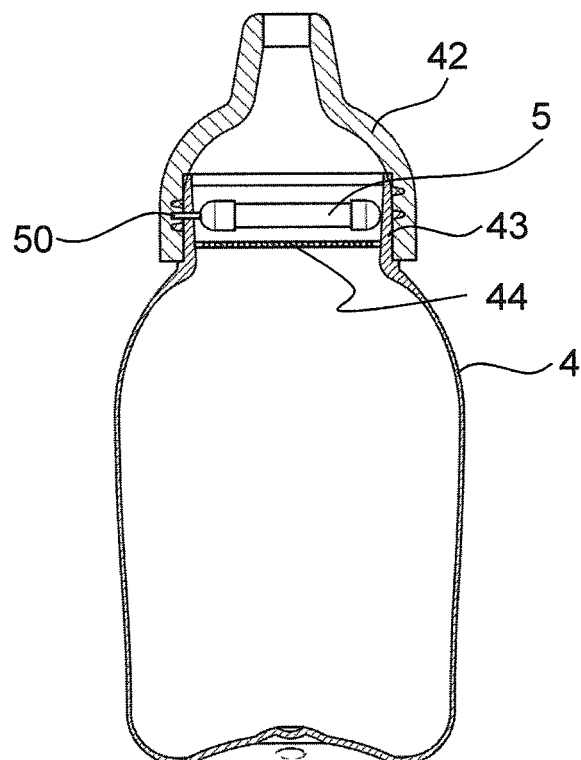
Figure 16:
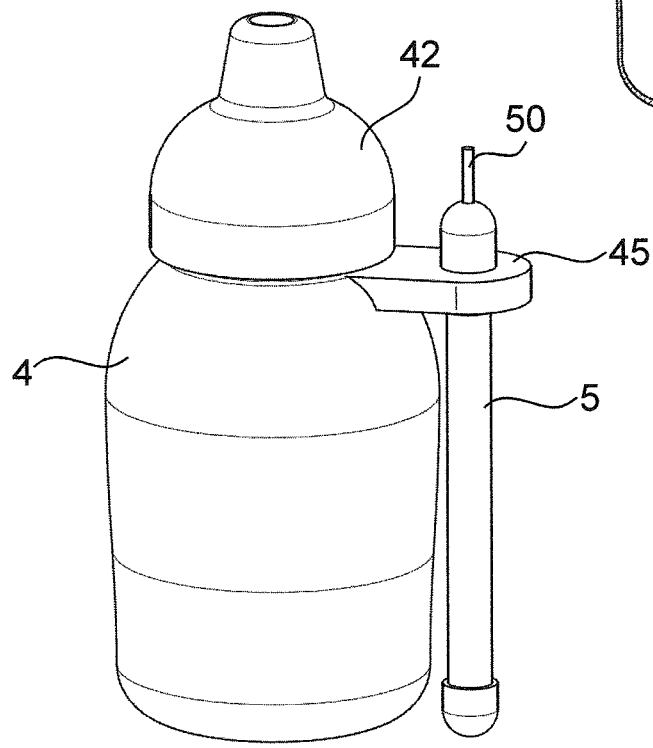

The embodiments according to FIG. 14 to 16 refer to feeding bottles 4. In the embodiment according to FIG. 14, the at least one UV lamp 5 is arranged within the interior 40 of the bottle 4. Preferably, it is arranged in the center and it extends preferably from the bottom to the neck part of the bottle 4.

In the embodiment according to FIG. 15, the at least one UV lamp 5 is arranged at the neck of the bottle 4. Between the neck 43 and the interior of the bottle 4, there is preferably a grid 44 hold within the bottle 4. Milk flowing from the interior 40 to the teat 42 has to pass this grid or mesh 44. Human milk is apportioned, i.e. small droplets are generated, and the reduced milk flow passes the irradiation area of the UV lamp 5.

In the embodiment according to FIG. 16, the at least UV lamp 5 is arranged outside of the bottle 4, wherein the bottle 4 comprises at least one holder 45 holding the UV lamp 5. Preferably, the at least one holder 45 is an integral part of the bottle 4, i.e. it is made in one piece. However it also can be attached to it, for example it can be welded or glued to the bottle 4.

In a further embodiment, the UV lamp is arranged in a teat unit of a feeding bottle.

The examples mentioned above can also be mixed with each other. For example the breastshield as well as the milk collection container and/or the feeding bottle and/or the milk line and/or the breastpump can comprise UV lamps.

According to the invention, the irradiation of milk with UV lamp and therefore the pasteurization of milk is made simple and applicable for breastpumping mother's and staff in a quite easy way.

The invention claimed is:

1. A device for inactivating or reducing an amount of biological contaminants in human milk, wherein the device comprises an interior for taking in human milk to be treated in order to inactivate or reduce the amount of biological contaminants, and at least one UV lamp for irradiating the milk being in the interior in order to subject it to the treatment, wherein the treatment is a first function of the device, wherein the device has a second function, the device being capable of fulfilling the first function at the same time as the second function, wherein the second function is one or more of milk expressing, milk collecting, milk storing, milk warming, milk feeding, milk processing and milk handling, and wherein the device is one of the group of a breastshield for applying to a human female breast for expressing human milk, a collection container for expressed human milk, a breastpump for expression of human milk, an attachment device for attachment to a breastpump for expression of human milk, a milk transporting line for connecting a breastshield to the breastpump, a chamber for a milk transporting line, an enteral feeding system, a feeding line, a chamber for a feeding line, a bottle warmer, a feeding bottle and a teat unit of a feeding bottle, wherein the interior of the device comprises means for generating a vortical flow and wherein the means for generating a vortical flow are at least one rib or at least one grid or mesh arranged in the interior.

2. A treatment system comprising the device of claim 1 and an ultrasonic device for homogenization of the human milk present in the device.

3. A device for inactivating or reducing an amount of biological contaminants in human milk, wherein the device comprises an interior for taking in human milk to be treated in order to inactivate or reduce the amount of biological contaminants, and at least one UV lamp for irradiating the milk being in the interior in order to subject it to the treatment, wherein the treatment is a first function of the device, wherein the device has a second function, the device being capable of fulfilling the first function at the same time as the second function wherein the second function is one or more of milk storing, milk warming, milk feeding, milk processing and milk handling, wherein the device is an enteral feeding system and the at least one UV lamp is arranged adjacent to a syringe of this enteral feeding system.

4. A device for inactivating or reducing an amount of biological contaminants in human milk, wherein the device comprises an interior for taking in human milk to be treated in order to inactivate or reduce the amount of biological contaminants, and at least one UV lamp for irradiating the milk being in the interior in order to subject it to the treatment, wherein the treatment is a first function of the device, wherein the device has a second function, the device being capable of fulfilling the first function at the same time as the second function, wherein the second function is one or more of milk expressing, milk collecting, milk storing, milk warming, milk feeding, milk processing and milk handling, and wherein the device is one of the group of a breastshield for applying to a human female breast for expressing human milk, a collection container for expressed human milk, a breastpump for expression of human milk, an attachment device for attachment to a breastpump for expression of human milk, a milk transporting line for connecting a breastshield to the breastpump, a chamber for a milk transporting line, an enteral feeding system, a feeding line, a chamber for a feeding line, a bottle warmer, a feeding bottle and a teat unit of a feeding bottle, wherein the interior of the device comprises means for generating a vortical flow and wherein the interior of the device comprises means for stirring the milk present in the interior and wherein the means for stirring the milk present in the interior are at least one rib or at least one grid or mesh arranged in the interior.

* * * * *